J. E. MITCHELL & D. PARKS.
MACHINE FOR MAKING LAMINATED SOLES.
APPLICATION FILED JUNE 26, 1916.
1,223,894.
Patented Apr. 24, 1917.
4 SHEETS—SHEET 1.
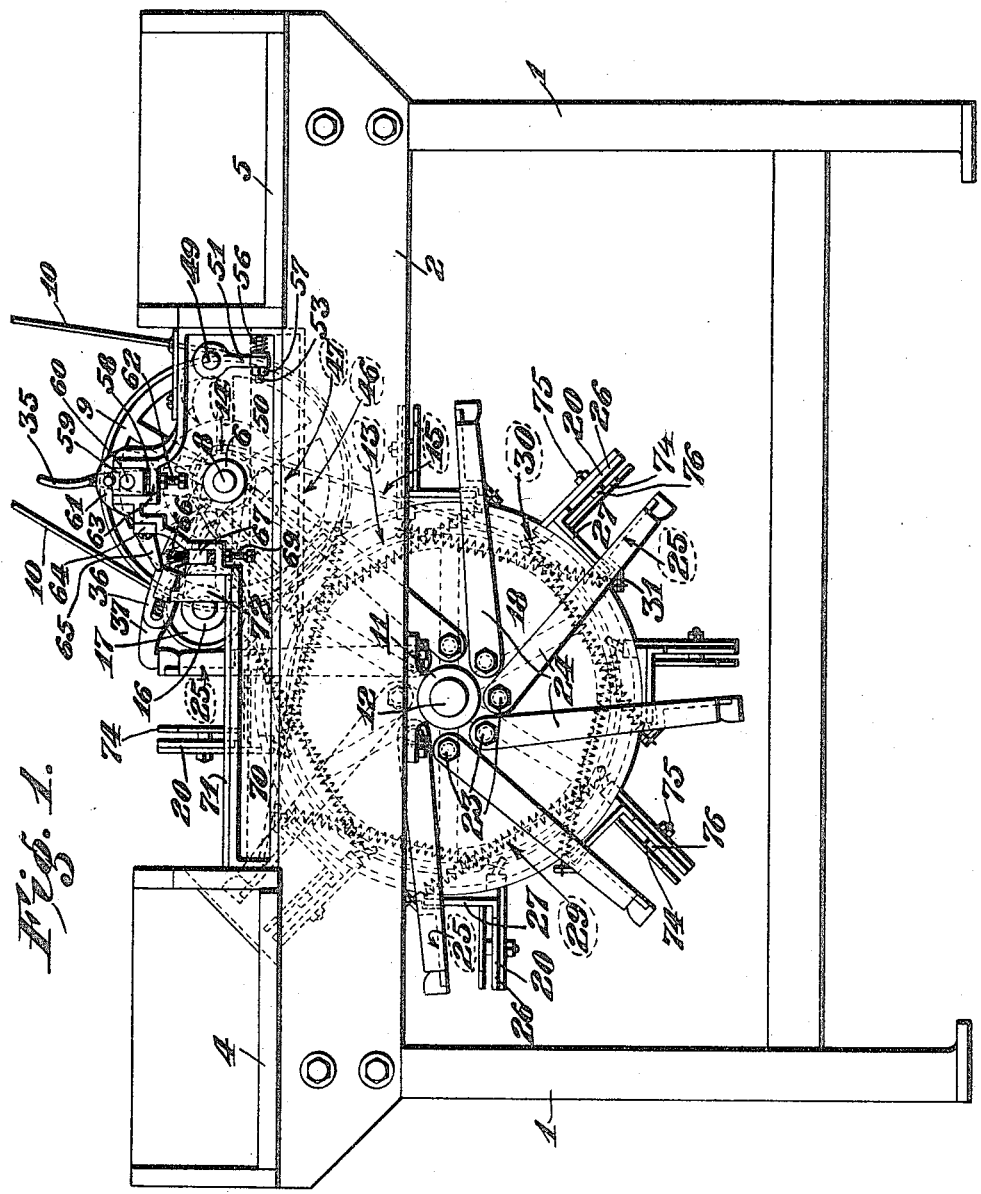
Inventors:
John E. Mitchell,
Dennis Parks,
By Bower & Elliott
their Atty.

J. E. MITCHELL & D. PARKS.
MACHINE FOR MAKING LAMINATED SOLES.
APPLICATION FILED JUNE 26, 1916.
1,223,894.
Patented Apr. 24, 1917.
4 SHEETS—SHEET 2.
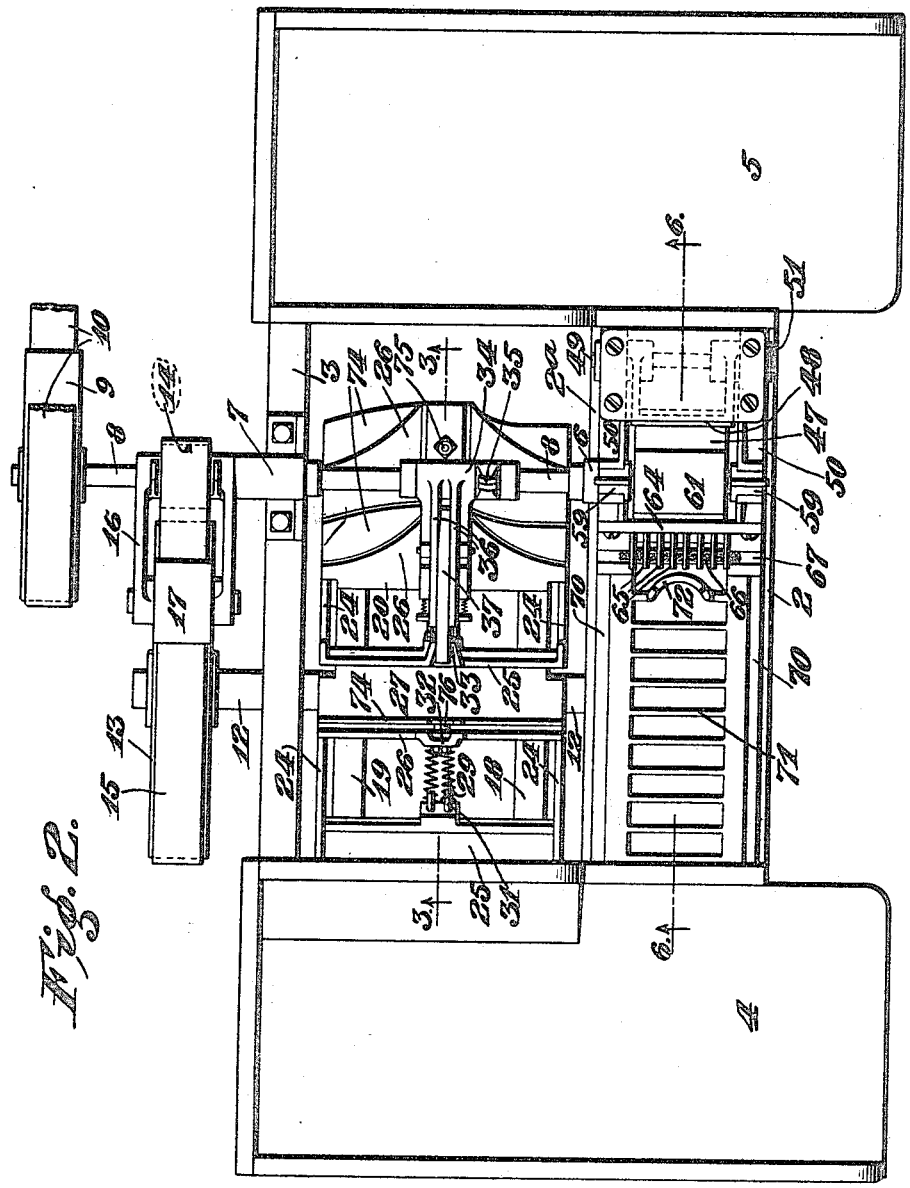
Inventors:
John E. Mitchell,
Dennis Parks,
By Bruce A. Elliott
their Atty.

J. E. MITCHELL & D. PARKS.
MACHINE FOR MAKING LAMINATED SOLES.
APPLICATION FILED JUNE 26, 1916.
1,223,894.
Patented Apr. 24, 1917.
4 SHEETS—SHEET 3.
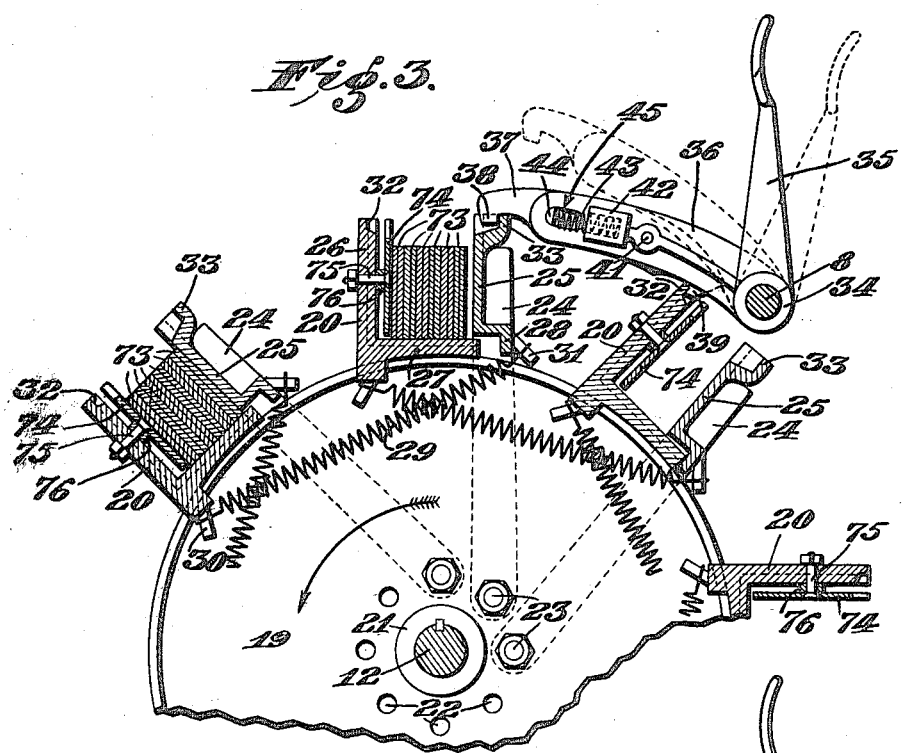
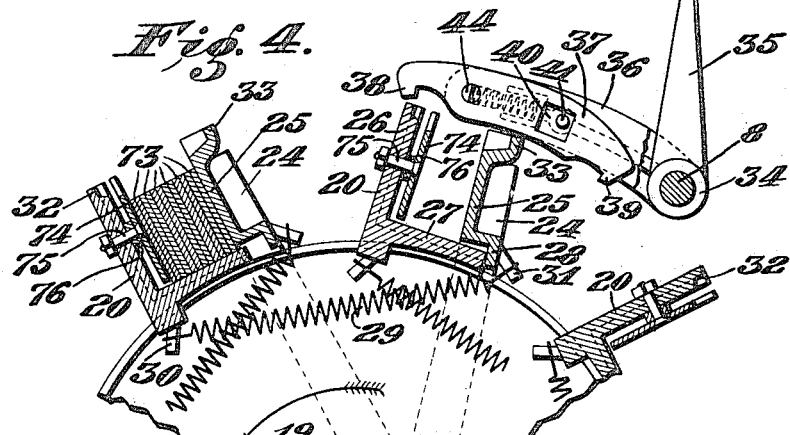
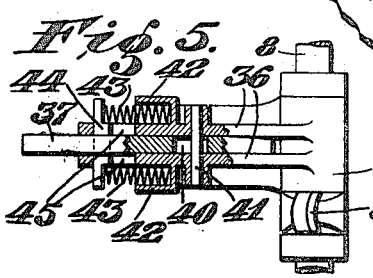
Inventor:
John E. Mitchell,
Dennis Parks,
By Bruce D. Elliott
their Atty.

J. E. MITCHELL & D. PARKS.
MACHINE FOR MAKING LAMINATED SOLES.
APPLICATION FILED JUNE 26, 1916.

1,223,894.

Patented Apr. 24, 1917.
4 SHEETS—SHEET 4.

Inventor:
John E. Mitchell,
Dennis Parks,
By Bruce A. Elliott
their Atty.

UNITED STATES PATENT OFFICE.

JOHN E. MITCHELL AND DENNIS PARKS, OF ST. LOUIS, MISSOURI.

MACHINE FOR MAKING LAMINATED SOLES.

1,223,894.   Specification of Letters Patent.   Patented Apr. 24, 1917.

Application filed June 26, 1916.   Serial No. 105,806.

*To all whom it may concern:*

Be it known that we, JOHN E. MITCHELL and DENNIS PARKS, citizens of the United States, residing in the city of St. Louis and State of Missouri, have invented new and useful Improvements in Machines for Making Laminated Soles, of which the following is a specification.

This invention relates to a novel machine for enabling laminated soles to be made in large quantities in a simple and efficient manner and with great rapidity.

The general object of the invention is to provide a machine, preferably of the rotary type, in which successive series of pasted layers, each pair of which constitutes a laminated sole, may be inserted in clamps carried by the machine and placed under compression, the machine operating in stages, so that at the end of a given cycle of movement, the series of soles inserted in the first clamp will have had their layers thoroughly pressed together and the paste between the layers will have had time to sufficiently dry, or set.

Detailed objects of the invention are to provide a movable series of clamps, and simple and novel means for operating the clamps, both to close them and press the inserted soles together and to open them and release the soles from compression; to provide means, which we have shown embodied in the form of a swiveled plate, for enabling the clamping members to accommodate themselves to soles which are not of uniform thickness throughout; to provide novel means for automatically arresting the movement of the machine, or that part carrying the clamping members, at stated intervals; and, finally, to provide certain novel details of construction and combinations and operations of parts, all of which will more clearly appear from the detailed description to follow.

In the accompanying drawings—

Figure 1 is a view in front elevation of a machine constructed according to our invention;

Fig. 2 is a top plan view of the same;

Fig. 3 is a fragmentary sectional view, on an enlarged scale, substantially on the line 3—3 of Fig. 2;

Fig. 4 is a similar view of the same parts, but in a different position;

Fig. 5 is a fragmentary view, partly in plan and partly in section, of a combined holding and releasing dog for coöperating with the clamping members;

Figure 6:
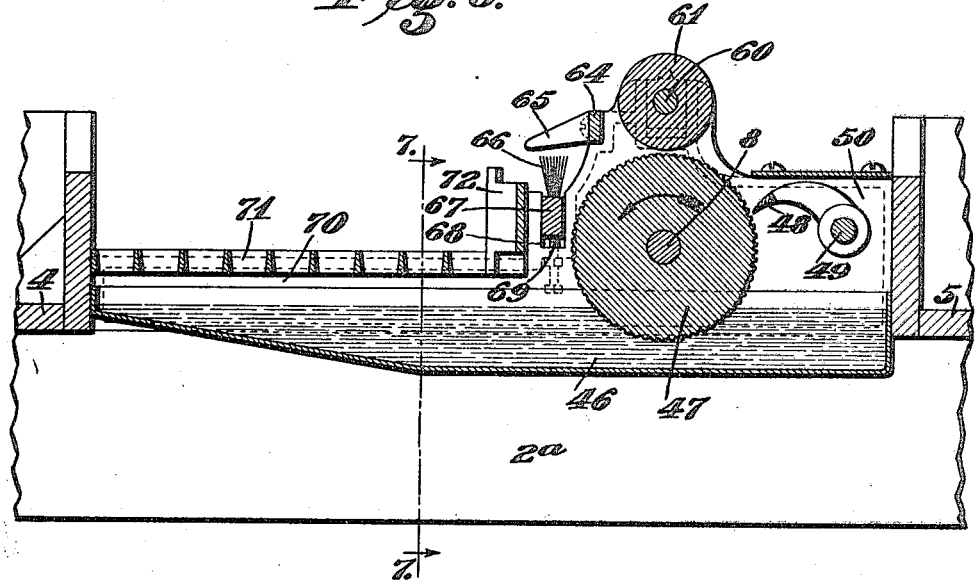
Fig. 6 is a longitudinal sectional view of the pasting mechanism, taken on the line 6—6 of Fig. 2.

Referring now to the drawings, the numeral 1 indicates, generally, the frame of the machine, having side members 2, 3, secured at the upper end thereof and on opposite ends of which are supported tables 4, 5, respectively, each of which is adapted to hold a relatively large number of layers for forming the laminated sole. Mounted in suitable bearings 6, 7, secured on the respective side frame members 2, 3, is the main driving shaft 8 provided at one end with a pulley 9 which is adapted to be driven by a belt 10. The shaft 8 extends from one side to and beyond the other side of the frame, as more clearly shown in Fig. 2. Mounted in bearings 11 secured, respectively, on the under side of a frame member 2ª (shown in Fig. 7) and the frame member 3, one of such bearings being shown in Fig. 1, is a shaft 12 which extends from one side to and beyond the other, as shown in Fig. 2, and has secured on its projecting end a pulley 13. Mounted on the shaft 8 is a small pulley 14, and over the pulleys 13 and 14 is passed a belt 15. Pivotally mounted on the shaft 8 is a yoke frame 16 having rotatably mounted in its outer end a pulley 17 which rests upon the belt 15 and preserves the requisite degree of tension thereon in the manner of the ordinary belt tightener. Fixedly secured on the shaft 12 between the side frame members 2 and 3 is a rotatable clamp carrier comprising two disks 18, 19, separated from each other and connected together at regular intervals around their peripheries by stationary clamping members 20 which, as shown more clearly in Fig. 2, extend between and project slightly beyond the outer sides of the disks 18 and 19, being connected to said disks in any preferred way so that the disks and clamping members 20 move together as a unitary structure. The hubs 21 of the disks 18 and 19 are encircled by a series of alining apertures 22 (see Fig. 3) and mounted in corresponding apertures in the two disks 18 and 19 are bolts 23 which pivotally support the inner ends of clamp levers 24 (Fig. 1) located, respectively, at the outer sides of the disks 18 and 19. These clamp levers project beyond the peripheries of the said disks and are connected at their outer ends by a plate 25. Each of the fixed clamping members 20 comprises a vertical or radial portion 26 (see Fig. 3) and a horizontal or base portion 27 extending at right angles to the vertical portion, and each of the clamping plates 25 has a shouldered portion 28 which normally engages the end of the base portion 27 to arrest the inward movement of the clamp levers 24. By inward movement is meant movement toward the fixed clamping member 26; and such movement is effected by a coil spring 29, which is connected at one end to a lug 30 on the lower end of the fixed clamping member 20 and at its other end to a lug 31 on the lower end of the movable clamping plate 25 coöperating with the adjacent clamping member 26, as clearly shown in Figs. 3 and 4. Each of the fixed clamping members 20 is provided in its upper edge with a shoulder 32, and each of the movable clamping plates 25 is provided at its upper side with an off-set shouldered portion 33. Mounted to coöperate with the clamp carrier is a combined engaging and releasing member (shown more clearly in Figs. 3, 4, and 5) which is in the form of a bell crank lever having a hub 34 loosely mounted on the shaft 8, an arm 35, serving as an actuating lever, and a bifurcated member affording two parallel lever arms 36. Located in the space between the arms 36 is a compound dog 37 having a hook 38 at one end and a similar hook 39 at its other. The lever arms 36 tend to move into position to render the dog operative. This may be accomplished simply by the action of gravity. The dog 37 is provided with a rectangular recess 40 through which extends a pin 41 mounted at its ends in the arms 36. Each of the arms 36 is provided with a cup-shaped housing 42 (Fig. 5) which receives one end of a coil spring 43, the outer end of each of said coil springs bearing against a cross bar 44 carried by the dog 37 and working in corresponding slots 45 formed in the arms 36 near the outer ends thereof. Mounted on the front of the machine, and extending between the tables 4 and 5 is a pasting device (shown more clearly in Figs. 6, 7 and 8) which will now be described.

Figure 7:
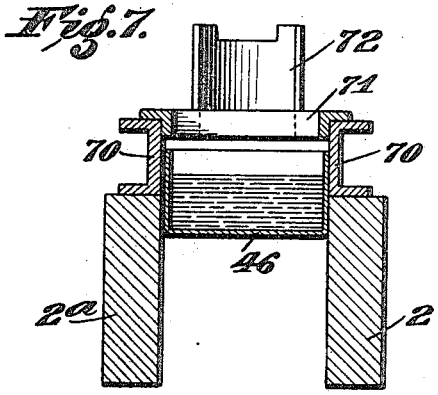
Fig. 7 is a cross-sectional view of the same, taken on the line 7—7 of Fig. 6.
Figure 8:
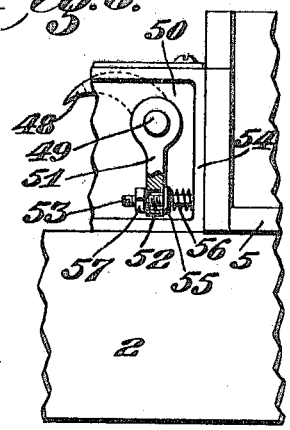
Fig. 8 is a fragmentary view, partly in section and partly in elevation, of an adjustable scraping device.

The numeral 46 indicates a reservoir for paste, and the numeral 47 a ribbed or corrugated paste roller which is secured on the driving shaft 8 near the outer end thereof, and as shown by Fig. 6 is adapted to be rotated with its lower portion submerged in the paste of the reservoir 46. The numeral 48 indicates a scraper for removing excess paste from the roller 47, said scraper being pivotally mounted on a shaft 49 mounted at its ends in side members 50, constituting the frame of the pasting device, and which side members are mounted on the respective frame members 2 and 2ᵃ as shown in Fig. 7. Depending from said scraper is an integral arm 51 which is slotted at its lower end, as indicated at 52, to extend over a screw-threaded bolt 53 secured at one end in a flange 54 at the end of one of the side members 50, as shown in Fig. 8, and to bear against a disk 55 loosely mounted on the bolt 53, and normally pressed outward by a coil spring 56. An adjusting nut 57 is mounted on the outer end of the bolt 53, and by turning this nut against the arm 51 the scraper 48 will be brought closer to the roller 47, and by unscrewing the nut the disk 51 will be pressed outward by the spring 56 to move the scraper away from the pasting roller. The side members 50 project above the pasting roller 47 and each of said upwardly-projecting portions is provided with a rectangular recess 58 which is adapted to receive a bearing block 59, each of said bearing blocks receiving one end of a shaft 60 on which is rotatably mounted an idler roller 61. Each of these bearing blocks is supported on a set-screw 62 extending through the bottom of a flange 63 projecting outward from the side of the respective side members 50, as shown in Fig. 1, by turning which set-screw in one direction or the other the blocks 59 may be raised and lowered to bring the roller 61 closer to or farther from the pasting roller 47. Mounted at opposite ends of the side members 50 is a bar 64 (see Figs. 2 and 6) provided with a series of fingers 65 which project over and slightly above the surface of a brush 66 carried by a block 67 located at its opposite ends in grooves 68 formed in the side members 50 and vertically adjustable therein by means of set-screws 69. (Figs. 1 and 6). Beyond the portion containing the recesses 68, that is, to the left in Fig. 6, the side members 50 are continued in the form of angle bars 70 (Fig. 7) and supported on these angle bars above the paste tank 46 is a grid 71 provided at its end adjacent to the brush 66 with a substantially semicircular stop 72.

From the operation of the machine to be presently described, it will be seen that a series of laminated soles 73, the layers of which are pasted together, are adapted to be placed between a clamping member 20 and a clamping plate 25, and the latter released to press the soles firmly together. Originally this was done by clamping the soles directly between said clamping member 20 and said clamping plate 25. A laminated insole is usually formed of a layer of leather and a layer of leather-board. It was soon found that these layers were not of uniform thickness so that frequently there would be a greater thickness of soles at one end of the clamping device than at the other, and the soles would not be uniformly compressed. To overcome this objection there is provided in each clamping device a plate 74 swiveled on the end of a bolt 75, which latter is mounted in the vertical portion 26 of the fixed clamping member 20, the plate 74 being held at a slight distance from the inner side of the clamping member by means of a collar 76. The plate 74 being thus mounted is free to move to accommodate itself to unequal thickness in the bundle of soles inserted between the clamping members and thus to insure uniform compression of the soles throughout their length.

In operation, the shaft 8 is continuously driven from the belt 10 and through the pulley 14 and belt 15 drives the shaft 12. This would result in rotating the clamp carrier, but such movement is normally prevented by the engagement of the hook 38 of the dog 37 with the shoulder 33 of one of the clamping plates 25. Assuming the parts to be in the position shown in Fig. 3, the operator strikes the actuating lever 35 with his hand, thereby raising the hook 38 of the dog 37 out of engagement with the shoulder 33 of the clamping plate 25, as shown by the dotted lines. During the time that the clamp carrier is held from rotation the pulley 14 will simply turn or slip in the belt 15. As soon as the dog 37 is turned upward to release its engagement with the clamping plate, however, the clamp carrier will be rotated by the belt 15. When the operator releases the engagement of the dog as above described, he at once removes his hand from the actuating lever 35, so that the arms 36 fall by gravity and rest upon the upper edge first of the adjacent clamping member 20 and then of the clamping plate 25, such latter or intermediate position of the parts being shown in Fig. 4. In the continued movement of the clamp carrier, however, the shoulder 33 of the clamping plate 25 supporting the arms 36 will pass off of said arms allowing the hook 38 to descend automatically and engage over the shoulder 33. The clamp carrier as a whole will continue to revolve, however, which will result in the particular clamping plate engaged being held while its corresponding clamping member 20 will be moved away from it by the momentum of the carrier against the resistance of the coil spring 29, the end of which is secured to the clamping plate 25 so held. The spring 29 is sufficiently powerful to permit of only a slight separation between the plates before the strength of the spring will tend to not only stop the further rotation of the clamp carrier but to turn it in the reverse direction. Before this latter can occur, however, the hook 39 on the opposite end of the dog will engage over the shoulder 32 on the first clamping member 20 adjacent to the clamping plate 25 engaged by the opposite end of the dog, and thus backward movement of the clamp carrier is prevented, and the same is held in the position shown in Fig. 3 with the clamping member 20 and the clamping plate 25 in their extreme separated positions. With the parts in such positions, the operator takes a sole layer from the table 4 and places it on the grid 71 with its heel-seat portion against the stop 72. He next takes a sole layer from the table 5, and inserts its end between the rollers 61 and 47. The roller 47 will cause the sole to be drawn between the two rollers, the pressure, regulated by the roller 61, being sufficient to cause the paste carried up by the roller 47 to be applied to the under side of the sole layer. As the latter emerges from between the rolls it passes under the guard fingers 65 and the brush 67 removes all surplus paste from it. As it passes out from under the guard fingers 65 the operator takes the pasted sole layer in his hand and places it on top of the sole layer resting on the grid 71. He next places a sole layer from the table 4 on top of the two layers resting on the grid 71, and passes a second sole layer through the pasting device in the manner previously described, and places it on the uppermost layer resting on the grid. This operation is continued until a pile of laminated soles of the desired thickness to be accommodated between the clamping members 20 and 25 is built up, when the operator takes such pile of soles and places them in position on the horizontal portion 27 of the clamping member 20 and against the swivel plate 74, as shown in Fig. 3. He then strikes the actuating lever 35 releasing the clamping plate 25 when its spring 29 immediately throws the released clamping plate into engagement with the soles 73 and places them under sufficient pressure to insure that each pair of layers will be thoroughly and uniformly pasted together. In the meantime the carrier revolves until the next clamping plate 25 is engaged by the dog and its clamp opened and the motion of the machine arrested, as previously described. If this particular clamp contains a series of soles which have been carried once around by the carrier, these soles are removed, a freshly compiled series of soles substituted, and the carrier allowed to rotate through another stage of movement, by releasing the dog 37. As will be clearly seen from an inspection of Figs. 3 and 4, each pile of layers thus placed between the clamping members will be held under compression until it has been carried through one revolution of the clamp carrier and brought again to the position shown at the top of Fig. 3, when the pile of lifts may be removed from the clamp, owing to the separation of its members in the manner previously described. The paste used is preferably of a quick-drying character, and by the time a given series of soles has been carried around and brought to its initial position it will be found that the paste is sufficiently set or dry to permit the removal and separation of the laminated soles without any danger of causing disarrangement of the pasted layers. In order to prevent racking of the machine through the abrupt stoppage of the rotation of the clamp carrier it has been found desirable to mount the dog 37 yieldingly between the arms 36 in the manner previously described, and as particularly shown in Fig. 5.

We claim:

1. A machine for making laminated soles comprising a movably mounted series of clamps, and means for separating the clamping members of one clamp and thereby arresting the movement of all the clamps.

2. A machine for making laminated soles comprising a movably mounted series of clamps, and means tending to move toward its operative position for separating the members of one clamp and thereby arresting the movement of all the clamps.

3. A machine for making laminated soles comprising a clamp carrier, a series of movable clamps carried thereby, and means for separating the members of one clamp and thereby offering a yielding resistance to further movement of all the clamps.

4. A machine for making laminated soles comprising a clamp carrier, a series of movable clamps carried thereby, and means for separating the members of one clamp and thereby yieldably limiting the extent of further movement of all the clamps.

5. A machine for making laminated soles comprising a clamp carrier, a series of movable clamps carried thereby, and means operating first to separate the members of one clamp and thereby arrest the movement of the clamp carrier in one direction, and then to lock the clamp carrier and clamps from movement in the opposite direction.

6. A machine for making laminated soles comprising a rotatable carrier, a series of clamps carried thereby, one member of each clamp being movable with respect to the carrier, and means operable at will for arresting the movement of the movable clamping members in succession and thereby utilizing the momentum of the carrier to open the clamp of which said movable clamping member is a part.

7. A machine for making laminated soles comprising a movable carrier having a series of clamps mounted thereon, one member of each clamp being movable with respect to the carrier, means operable at will for arresting the movement of the movable clamping members in succession, and means for controllably utilizing the momentum of the carrier to open the clamp of which said movable clamping member is a part.

8. A machine for making laminated soles comprising a rotatable carrier, a series of clamps mounted on said carrier, one member of each clamp being movable with respect to the carrier and having spring connection therewith, and means operable at will for arresting the movement of said movable clamping members and simultaneously utilizing the momentum of the carrier under the control of said spring to open the clamp of which said movable clamping member is a part.

9. A machine for making laminated soles comprising a series of movably supported clamps each of which has one of its members also movable relative to the other, and means operable at will for arresting the movement of the movable clamping members in succession and thereby utilizing the momentum of all the other clamps to open the clamp of which the arrested clamping member is a part.

10. A machine for making laminated soles comprising a movable carrier, a series of clamps carried thereby each of which includes a movable clamping member, a spring connecting each of said movable clamping members with said carrier, and means for engaging in turn each of said movable clamping members to arrest its movement and the movement of said carrier and thereby interpose the resistance of said spring to the further movement of said carrier.

11. A machine for making laminated soles comprising a movable carrier, a series of clamps carried thereby each of which includes a movable clamping member, a spring connecting each of said movable clamping members with said carrier, means for engaging in turn each of said movable clamping members to arrest its movement and the movement of said carrier and thereby interpose the resistance of said spring to the further movement of said carrier, and means for locking the carrier against movement in the reverse direction under the action of said spring.

12. A machine for making laminated soles comprising a movable carrier having a series of clamping members secured at intervals thereon, a series of clamping plates pivotally mounted on said carrier and coöperating, respectively, with said clamping members, a spring connecting each clamping plate with said carrier and tending normally to draw the clamping plate toward the corresponding clamping member, and automatic means for engaging each clamping plate in turn to arrest its further movement and thereby interpose the resistance of its spring to the continued movement of said carrier.

13. A machine for making laminated soles comprising a movable carrier having a series of clamping members secured at intervals thereon, a series of clamping plates pivotally mounted on said carrier and coöperating, respectively, with said clamping members, a spring connecting each clamping plate with said carrier and tending normally to draw the clamping plate toward the corresponding clamping member, automatic means for engaging each clamping plate in turn to arrest its further movement and the movement of said carrier and thereby interpose the resistance of its spring to the continued movement of said carrier, and automatic means for locking the carrier against movement in the reverse direction under the action of said spring.

14. A machine for making laminated soles comprising a rotatable carrier having a series of clamping members secured at intervals thereon, a series of clamping plates pivotally mounted on said carrier and coöperating, respectively, with said clamping members, a spring connecting each clamping plate with said carrier and tending normally to draw the clamping plate toward the corresponding clamping member, and automatic means for engaging each clamping plate in turn to arrest its further movement and thereby interpose the resistance of its spring to the continued movement of said carrier.

15. A machine for making laminated soles comprising a series of rotatably mounted clamps, one member of each of which is movable with respect to the other, a gravity-catch adapted to ride upon said clamps and in the movement of the latter to engage in turn each movable member of a clamp while the other member is separated therefrom under the momentum of all the clamps, and means for limiting said opening movement of the clamp.

16. A machine for making laminated soles comprising a circular rotatable carrier, a series of clamping members fixedly secured at intervals about said carrier, a series of members pivotally mounted on said carrier and supporting a series of clamping plates coöperating, respectively, with said fixed clamping members, a spring connecting each of said pivotal members with said carrier and tending normally to draw the clamping plate toward its corresponding fixed clamping member, and automatic means for engaging at will each of said clamping plates and thereby interposing the resistance of its spring to limit the movement of the fixed clamping member away from said clamping plate under the momentum of the carrier.

17. A machine for making laminated soles comprising a circular rotatable carrier, a series of clamps mounted at intervals around said carrier, one member of each of which is movable with respect to the carrier and the other member of the clamp, and a gravity-catch comprising a double dog arranged in the path of said clamps and adapted to engage at one end a movable member of each clamp in turn and at its other end to engage the fixed member of an adjacent clamp.

18. A machine for making laminated soles comprising a circular rotatable carrier, a series of clamps mounted at intervals around the carrier one member of each clamp being movable with respect to the carrier and the other member of the clamp, a spring connecting each of said movable members with said carrier, a pivoted member normally supported on said clamps, a double spring-controlled dog mounted in said member and adapted to engage at one end in turn each of said movable clamping members and thereby interpose the resistance of said spring to the further movement of the carrier under momentum, and then to engage at its other end the fixed member of an adjacent clamp to prevent movement of the carrier in a reverse direction under the pull of said spring.

19. In a machine of the class described, a rotatable carrier, a series of clamps located at intervals around the periphery of said carrier, means for automatically opening at will each clamp in succession, and means for arresting the movement of the carrier with the clamp open.

20. In a machine of the class described, a rotatable carrier having a series of clamps mounted at intervals thereon, each of said clamps comprising a member fixed on the carrier and a member pivoted thereto, means operable in the rotation of the carrier to engage each pivoted member in turn and allow the fixed member to be carried a given distance therefrom, and means for arresting the movement of the carrier after such separation of the two clamping members.

21. A machine for making laminated soles comprising clamping members relatively movable toward each other, one of said clamping members having a pressure plate loosely mounted thereon.

22. A machine for making laminated soles comprising clamping members relatively movable toward each other, one of said clamping members having a pressure plate swivelled thereon.

In testimony whereof, we have hereunto set our hands.

JOHN E. MITCHELL.
DENNIS PARKS.

Copies of this patent may be obtained for five cents each, by addressing the "Commissioner of Patents, Washington, D. C."